(12) United States Patent
Menzenbach et al.

(10) Patent No.: US 8,977,442 B2
(45) Date of Patent: Mar. 10, 2015

(54) SELF-PROPELLED CIVIL ENGINEERING MACHINE

(75) Inventors: Christoph Menzenbach, Neustadt/Wied (DE); Joern Von Der Lippe, Koenigswinter (DE); Cyrus Barimani, Koenigswinter (DE); Guenter Haehn, Koenigswinter (DE)

(73) Assignee: Wirtgen GmbH (DE)

( * ) Notice: Subject to any disclaimer, the term of this patent is extended or adjusted under 35 U.S.C. 154(b) by 423 days.

(21) Appl. No.: 13/269,816

(22) Filed: Oct. 10, 2011

(65) Prior Publication Data

US 2012/0090909 A1 Apr. 19, 2012

(30) Foreign Application Priority Data

Oct. 13, 2010 (DE) .......................... 10 2010 048 185

(51) Int. Cl.
*G06F 17/00* (2006.01)
*E01C 23/088* (2006.01)
*B62D 7/15* (2006.01)
*B62D 15/02* (2006.01)
*E01C 19/00* (2006.01)
*E02F 9/20* (2006.01)
*E02F 9/26* (2006.01)

(52) U.S. Cl.
CPC ............ *E01C 23/088* (2013.01); *B62D 7/1509* (2013.01); *B62D 15/0275* (2013.01); *E01C 19/004* (2013.01); *E02F 9/2087* (2013.01); *E02F 9/26* (2013.01)
USPC ........................................................ 701/50

(58) Field of Classification Search
USPC .......... 701/50, 49, 41, 36; 345/581, 619, 629, 345/647, 660, 7; 172/430; 348/119
See application file for complete search history.

(56) References Cited

U.S. PATENT DOCUMENTS

| | | | |
|---|---|---|---|
| 5,484,227 A | 1/1996 | Ikeda et al. | |
| 5,973,733 A * | 10/1999 | Gove | 348/208.13 |
| 6,222,447 B1 * | 4/2001 | Schofield et al. | 340/461 |
| 6,366,221 B1 * | 4/2002 | Iisaka et al. | 340/932.2 |
| 6,487,481 B2 * | 11/2002 | Tanaka et al. | 701/41 |
| 6,539,288 B2 * | 3/2003 | Ishida et al. | 701/1 |
| 6,654,670 B2 * | 11/2003 | Kakinami et al. | 701/1 |
| 7,295,228 B2 * | 11/2007 | Roberts et al. | 348/143 |

(Continued)

FOREIGN PATENT DOCUMENTS

| | | |
|---|---|---|
| DE | 69411064 T2 | 12/1998 |
| DE | 10334613 A1 | 2/2005 |

(Continued)

*Primary Examiner* — Helal A Algahaim
*Assistant Examiner* — Genna Mott
(74) *Attorney, Agent, or Firm* — Patterson Intellectual Property Law, PC; Lucian Wayne Beavers (57) ABSTRACT

A civil engineering machine includes an arrangement for assisting the driver of the machine when reversing which has a calculating unit to determine data which defines at least one trajectory of the civil engineering machine as a function of the position of the front and rear running gear, both as a function of a steering angle and as a function of a mode of steering. The arrangement for assisting the driver of the machine when reversing also has an image detecting unit for detecting an image of the rear part of the civil engineering machine and a display unit for displaying the detected image of the rear part of the civil engineering machine. An image processing unit superimposes a representation of the at least one trajectory on the image of the rear part of the civil engineering machine which is displayed on the display unit.

25 Claims, 9 Drawing Sheets

(56) References Cited

U.S. PATENT DOCUMENTS

| | | |
|---|---|---|
| 7,363,130 B2 * | 4/2008 | Sakakibara ............... 701/36 |
| 2007/0299572 A1 * | 12/2007 | Okamoto et al. ........... 701/28 |
| 2009/0167856 A1 * | 7/2009 | Chou et al. ............... 348/118 |
| 2010/0109422 A1 | 5/2010 | Busley et al. |
| 2010/0286872 A1 * | 11/2010 | Endo et al. ............... 701/41 |
| 2012/0016555 A1 * | 1/2012 | Ghneim .................... 701/41 |

FOREIGN PATENT DOCUMENTS

| | | |
|---|---|---|
| WO | 2007031531 A1 | 3/2007 |
| WO | 2008012109 A1 | 1/2008 |

\* cited by examiner

SELF-PROPELLED CIVIL ENGINEERING MACHINE

FIELD

The invention relates to a self-propelled civil engineering machine which has running gear having wheels or other running-gear units which are at the front and rear in the direction of working which is carried by the running gear.

BACKGROUND

Known self-propelled civil engineering machines, which include in particular road milling machines, road recyclers and road stabilisers, have a working arrangement to carry out the civil engineering operation of the civil engineering machine. The working arrangement may for example be a milling arrangement and in particular a milling drum.

Civil engineering machines of this kind differ from motor vehicles, and in particular from private cars, in that the civil engineering machine can be steered both with the front wheels or other running-gear units and with the rear wheels or other running-gear units. The positions assumed by, i.e. the steering angles of, the front and rear wheels or other running-gear units may be in the same direction or in opposite directions in this case. If the front wheels or other running-gear units and the rear wheels or other running-gear units are steered in opposite directions, the civil engineering machine is able to travel through a tight curve whereas the civil engineering machine is able to travel with a sideways displacement if the front and rear wheels or other running-gear units are steered in the same direction.

The stipulating of different steering angles allows the driver of the machine to move the civil engineering machine exactly over the terrain. When the civil engineering machine is being moved backwards however, the driver is faced with the problem that it is difficult for him to see the rear part of the machine. It is true that the civil engineering machine is only operated in the forward direction during the normal course of work but for it to be loaded, positioned to start work or parked, the driver usually has to reverse the civil engineering machine in a confined space. machine is intended to have himself directed by a second person when travelling backwards. Travelling backwards is nevertheless difficult because there are limits as to how much of the rear part that the driver can see. There are also known self-propelled civil engineering machines which have a camera at the rear end and a screen at the driver's station. The driver of the civil engineering machine can thus see the rear part, but even with a camera, it is difficult to estimate how the civil engineering machine is moving as it travels back.

For motor vehicles, and in particular for private cars, there are known arrangements which assist the driver when parking the vehicle. Such arrangements are also referred to as driver assistance systems.

DE 103 34 613 A1 describes an arrangement for motor vehicles which, as a function of the steering angle to which the wheels are turned, indicates the region for the movement of the vehicle, which is also referred to as a travel tube, on a screen. A driver assistance system for tractor vehicles with trailers is known from WO 2008/012109 A1.

The known driver assistance systems for cars and lorries are not suitable for self-propelled civil engineering machines which can be steered both with the front wheels or other running-gear units and with the rear wheels or other running-gear units. The adjustment of the chassis of the machine in the heightwise direction and to give a longitudinal or transverse inclination also makes special demands on a driver assistance system in self-propelled civil engineering machines.

SUMMARY

The object underlying the invention is to specify a self-propelled civil engineering machine which makes it easier for the driver of the machine to reverse, in particular for the purpose of loading, positioning to start work or parking the civil engineering machine.

The self-propelled civil engineering machine according to one embodiment is characterised by an arrangement for assisting the driver of the machine when reversing which has a unit for sensing the position of the front wheels or other running-gear units and rear wheels or other running-gear units and a calculating unit to determine data which defines at least one trajectory of the civil engineering machine as a function of the position of the front wheels or other running-gear units and the rear wheels or other running-gear units. The position of the running gear, wheels, or other running-gear units may also be referred to as a steering angle, and the unit for sensing the position or steering angle of the running gear may also be referred to as a position sensor. Additionally, the arrangement for assisting the driver of the machine when reversing also has an image detecting unit for detecting an image of the rear part of the civil engineering machine and a display unit for displaying the detected image of the rear part of the civil engineering machine. By an image processing unit, at least one trajectory by which the movement of the civil engineering machine over the terrain or along traffic-carrying routes or surfaces is defined is superimposed on the image of the rear part of the civil engineering machine which is displayed on the display unit. Reversing is traveling opposite a working direction of the civil engineering machine, or in other words, traveling such that the rear running gear goes before the front running gear.

The arrangement for assisting the driver of the machine when reversing takes into account the position of both the front and the rear wheels or other running-gear units. One or more trajectories which are superimposed on the image of the rear part of the civil engineering machine may be determined. By reference to the at least one trajectory, the driver of the machine is able to make an exact estimate, when reversing, of how the civil engineering machine will travel around any obstacles which there may be, as a function of the positions of both the front and the rear wheels or other running-gear units.

In one embodiment, the unit having the controls of the civil engineering machine has both means for stipulating a steering angle for the front and/or rear wheels or other running-gear units and means for selecting one mode of steering from a plurality of modes of steering. In this case the unit having the controls of the civil engineering machine co-operates with the steering arrangement of the civil engineering machine in such a way that the steering arrangement sets the stipulated steering angle or the selected mode of steering. The calculating unit of the arrangement for assisting the driver of the machine when reversing, which determines the data which defines at least one trajectory as a function of the positions of the front and rear wheels or other running-gear units, has, in the preferred embodiment, means for calculating the data defining the at least one trajectory not only as a function of the positions of the front and/or rear wheels or other running-gear units but also as a function of the selected mode of steering.

In one embodiment, the driver of the machine may determine how the machine will behave when reversing immediately by stipulating the steering angle and mode of steering. By varying the steering angle on the one hand and the mode of steering on the other, the driver of the machine can estimate what effects different steering angles and modes of steering have. This makes it possible for the driver of the machine not only to make a better estimate of the movement of the machine when reversing but also to stipulate the optimum steering angle in the optimum mode of steering or vice versa.

The means for calculating the data defining the at least one trajectory are so designed, in one embodiment, that the data defines the trajectory, with the selected mode of steering and the stipulated steering angle, in a co-ordinate system referred to (i.e., referenced to) the running gear of the civil engineering machine. This co-ordinate system is preferably a co-ordinate system which does not change if the chassis of the machine is adjusted in the heightwise direction to have a stipulated transverse and/or longitudinal inclination relative to the running gear.

One embodiment of the civil engineering machine assumes that the steering of the civil engineering machine substantially follows the Ackermann principle, meaning that extensions of the axes of the wheels or other running-gear units intersect at a centre of the turning circle. If the civil engineering machine is steered with steering angles in opposite directions, the trajectories can be represented by arcs which can be defined by starting and end points and a centre of the turning circle and/or radius. If the at least one trajectory is a straight line, which is the case when the steering angles of the steering are in the same direction, the trajectory can be defined by the starting and end points alone. Basically however, it is also possible for the trajectory to be defined in some other way, such for example as by the co-ordinates of a plurality of points in the co-ordinate system.

In one embodiment, the calculating unit has means for converting the data defining the at least one trajectory to be in a co-ordinate system referred to the image detecting unit in which the image is displayed on the display unit. In one embodiment the means for converting the data includes a processor. It is possible in this way for a co-ordinate system different from the co-ordinate system of the civil engineering machine to be selected for the image detecting unit. Consequently, the image detecting unit can be arranged as desired on the civil engineering machine to enable the driver of the machine to be shown an image at a given angle of viewing.

In one embodiment of the civil engineering machine, the chassis of the machine is designed to be adjustable in the heightwise direction and/or in inclination. It is advantageous if the at least one trajectory is correctly represented in the image of the rear part displayed on the display unit regardless of the height and/or inclination of the chassis of the machine. The calculating unit may also correct the data defining the at least one trajectory in the co-ordinate system referred to the image detecting unit, on the basis of a correcting function by which allowance is made for a change in the longitudinal inclination and/or transverse inclination and/or height of the image detecting unit relative to the co-ordinate system referred to the running gear of the civil engineering machine.

A change in the height and/or inclination of the chassis of the machine relative to the co-ordinate system referred to the running gear of the civil engineering machine also results in a change in the height and/or inclination of the image detecting unit arranged on the chassis of the machine. The means for correcting the data defining the at least one trajectory ensures that a change in the height and/or inclination of the chassis of the machine relative to the co-ordinate system referred to the chassis of the machine does not result in the at least one trajectory being incorrectly displayed on the display unit. The data defining the at least one trajectory is thus converted as a function of the height and/or inclination of the chassis of the machine in such a way that it is again matched to the image of the rear part which is displayed on the display unit.

Because the objective lenses of known cameras distort, particularly in the edge regions, inaccuracies in the representation of the trajectory may occur relative to the representation of the image of the rear part of the civil engineering machine. One embodiment corrects the data defining the at least one trajectory in the co-ordinate system referred to the image detecting unit, on the basis of a correcting function by which allowance is made for distortion of the image detected by the image detecting unit. In this embodiment, the at least one trajectory is distorted in the same way as the image of the rear part is distorted. These embodiments manage with a relatively small calculating capacity because there is no need for the image to be distorted and it is only the trajectory which is distorted to enable the two representations on the display unit to be shown in the correct relationship to one another. It is however also possible for the calculating unit to have means for correcting the image of the rear part of the civil engineering machine in the co-ordinate system referred to the image detecting unit, on the basis of a correcting function by which the distortion of the image detected by the image detecting unit is corrected. However, a higher calculating capacity is required for this purpose.

A trajectory is a path which a random point follows. This point may be situated on the civil engineering machine, in order to be characteristic of precisely one point on the machine, or may even be situated next to the machine in order to be characteristic of a safety distance from a point situated on the machine. The data by which the at least one trajectory is defined may be data of different types. The trajectory may for example be defined by a starting and an end point and a centre of a turning circle or a radius. The length of travel between the starting and end points may be the length of the machine or part of the length of the machine. Additionally, a plurality of trajectories may be displayed, with one of the trajectories representing the length of the machine and the other trajectories representing parts of the length of the machine.

If the trajectories correspond precisely to the length of the machine or parts of the length of the machine, the point should be situated at the extreme end of the tail end of the machine in order to show the driver of the machine the position of the tail end when reversing. The movement of a point on the working arrangement of the machine, such for example as on the milling arrangement, may for example also be shown visually by a trajectory.

It is possible to show the trajectories not only as lines between starting and end points but also as point clouds in order to give a visual representation of the movement of the civil engineering machine on the display unit.

BRIEF DESCRIPTION OF THE DRAWINGS

In what follows, an embodiment of the invention will be explained in detail by reference to the drawings:
In the drawings.

DETAILED DESCRIPTION

Figure 1:
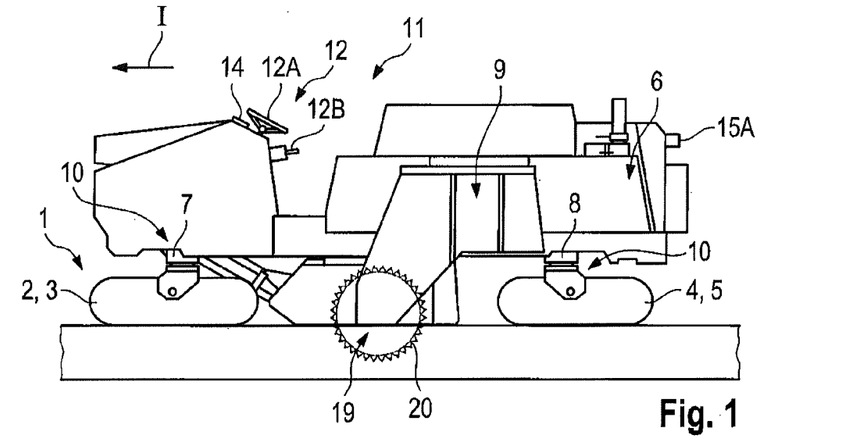
FIG. 1 is a view from the side of a road milling machine as an example of a self-propelled civil engineering machine.

FIG. 1 shows a road milling machine as an example of a self-propelled civil engineering machine which has an arrangement for assisting the driver of the machine when reversing.

The road milling machine is what is referred to as a large milling machine for milling away the surfacing of roads. The civil engineering machine has running gear 1 which has two running-gear units 2, 3 which are at the front in the direction of working direction I and two running-gear units 4, 5 which are at the rear in the direction of working direction I. Rather than front and rear running-gear units, the running gear may equally well have front and rear wheels. In what follows the running-gear units will be referred to simply as wheels.

The running gear 1 carries a chassis 6 of the machine which is adjustable in the heightwise direction relative to the terrain or the traffic-carrying route or traffic-carrying surface by means of two front and two rear lifting columns 7, 8, the longitudinal and/or transverse inclination of the chassis 6 of the machine also being adjustable.

The civil engineering machine has a measuring arrangement (not shown) by which the position of the chassis of the machine relative to a reference plane, i.e. the height and inclination of the chassis of the machine relative to the reference plane, is sensed. A measuring arrangement of this kind is described in WO 2007/032531 A1.

The civil engineering machine also has a drive arrangement 9 (not shown in detail) for driving the front and rear wheels 2, 3; 4, 5 and a steering arrangement 10 for steering the front and rear wheels 2, 3; 4, 5, together with a milling arrangement 19 having a milling drum 20 which is arranged between the front and rear wheels.

Arranged on the chassis 6 of the machine between the front and rear wheels 2, 3; 4, 5 is the driver's station 11 of the civil engineering machine. The driver's station may of course equally well be arranged at some other point, such as in front of the front wheels for example. Situated at the driver's station 11 is a unit 12, which is merely indicated, having the controls of the civil engineering machine. The unit 12 having the controls (i.e., the control unit) has a steering apparatus 12A for stipulating a given steering angle for the front and rear wheels 2, 3 and a selector 12B for selecting a given mode of steering. The steering apparatus 12A for stipulating the steering angle may be a steering wheel 12A, whereas the selector for selecting the mode of steering may be a selecting lever 12B. The steering wheel 12A and selecting lever 12B are indicated in FIG. 1. The unit 12 having the controls co-operates with the steering arrangement 10 as follows.

The driver of the machine can select a given mode of steering from a plurality of modes of steering with the selecting lever 12B. In a mode of steering which is referred to as "co-ordinated steering", the civil engineering machine is steered in opposite directions by the front and rear wheels 2, 3; 4, 5, with the front wheels 2, 3 and rear wheels 4, 3 pointing in opposite directions. The driver of the machine selects this mode of steering when he wants to follow a tight radius. In a mode of steering which is referred to as "crab steering", the civil engineering machine is steered in the same direction by the front and rear wheels 2, 3; 4, 5, with the front wheels 2, 3 and rear wheels 4, 5 pointing in the same direction. This mode of steering is selected when the civil engineering machine is to travel with a sideways displacement. The civil engineering machine may however also be steered only with the front wheel or only with the rear wheels.

It is true of all the modes of steering that the driver of the machine steers the civil engineering machine with the steering wheel 12A. When this is done it is, as a function of the mode of steering, only the rear wheels, only the front wheels or both the front wheels and the rear wheels which are steered, the front and rear wheels then being steered either in opposite directions or in the same direction. The steering angles which come into being at the front and rear axles are laid down by the geometry of the steering arrangement, as will be explained below.

Figure 2:
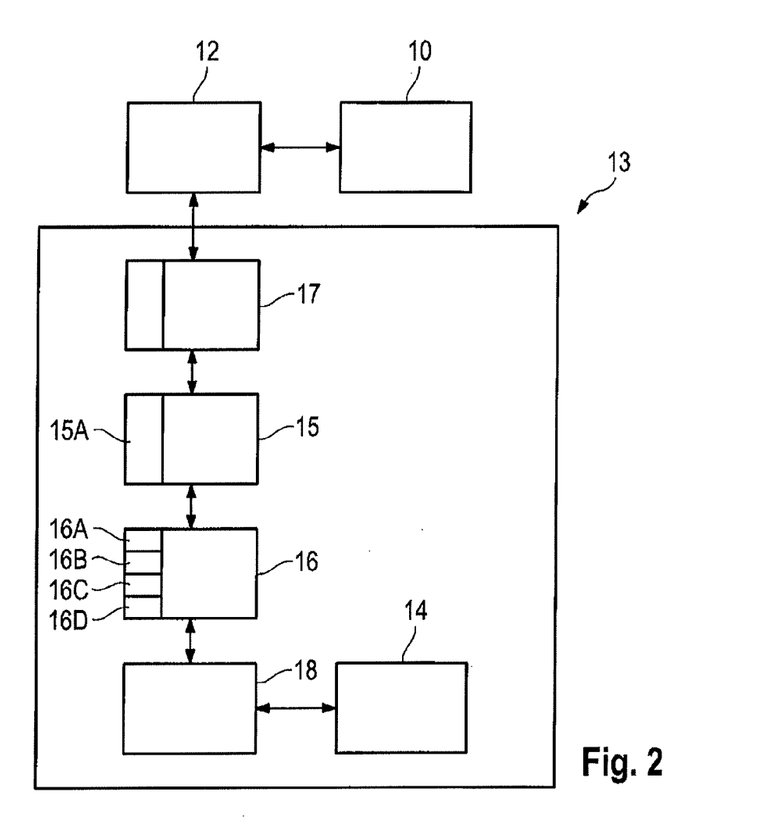
FIG. 2 is a block circuit diagram of an arrangement for assisting the driver of the machine when reversing.

FIG. 2 is a block circuit diagram of the arrangement 13 for assisting the driver of the machine when reversing, which co-operates with the steering arrangement 10 and the unit 12 having the controls of the civil engineering machine. The arrangement 13 for assistance when reversing has a display unit 14, such for example as a display screen arranged at the driver's station 12 on which an image of the rear part of the civil engineering machine together with one or more trajectories is displayed, from which the driver of the machine can estimate how the civil engineering machine moves with a stipulated steering angle and in the selected mode of steering.

The image of the rear part of the civil engineering machine is detected by an image detecting unit 15 which has a camera 15A arranged on the rear part of the chassis of the machine. The camera 15A follows the movements of the chassis 6 of the civil engineering machine in respect of its height and inclination relative to the terrain. The camera 15A is preferably situated on the tail end of the machine.

The arrangement 13 for assistance when reversing has a calculating unit 16 by which the data which defines at least one trajectory of the civil engineering machine as a function of the position of the front and rear wheels and as function of the mode of steering is determined. The position of the front and rear wheels is sensed by a unit 17 which may be part of the arrangement 13 for assistance when reversing or part of the steering arrangement 10. The block circuit diagram in FIG. 2 shows the unit 17 as part of the arrangement 13.

As well as this, the arrangement 13 for assisting the driver of the machine also has an image processing unit 18 which superimposes on the image of the rear part of the civil engineering machine displayed on the display unit 14 the at least one trajectory which is determined by the calculating unit 16. Consequently, the driver of the machine sees both the at least one trajectory and the rear part of the civil engineering machine on the display unit, thus enabling the driver of the machine to correlate the movement of the civil engineering machine with the objects situated in the terrain or on the traffic-carrying route. As well as the as at least one trajectory, it is also possible for other information to be shown such for example as the distances of the objects situated in the terrain or on the traffic-carrying route away from the civil engineering machine.

In what follows, the construction and operation of the individual components of the arrangement 13 for assisting the driver of the machine when reversing will be explained in detail for the individual modes of steering.

Figure 3A:
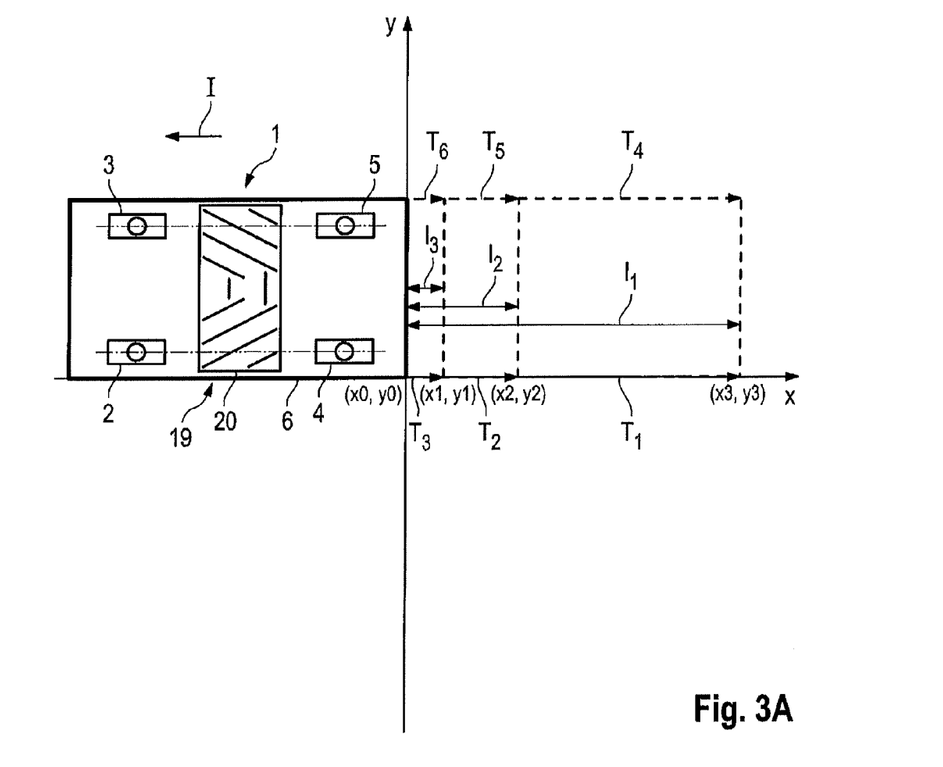
FIG. 3A is a highly simplified schematic view of the self-propelled civil engineering machine and a view of the trajectories in a co-ordinate system referred to the civil engineering machine, with the civil engineering machine reversing straight backwards in this case.
Figure 3B:
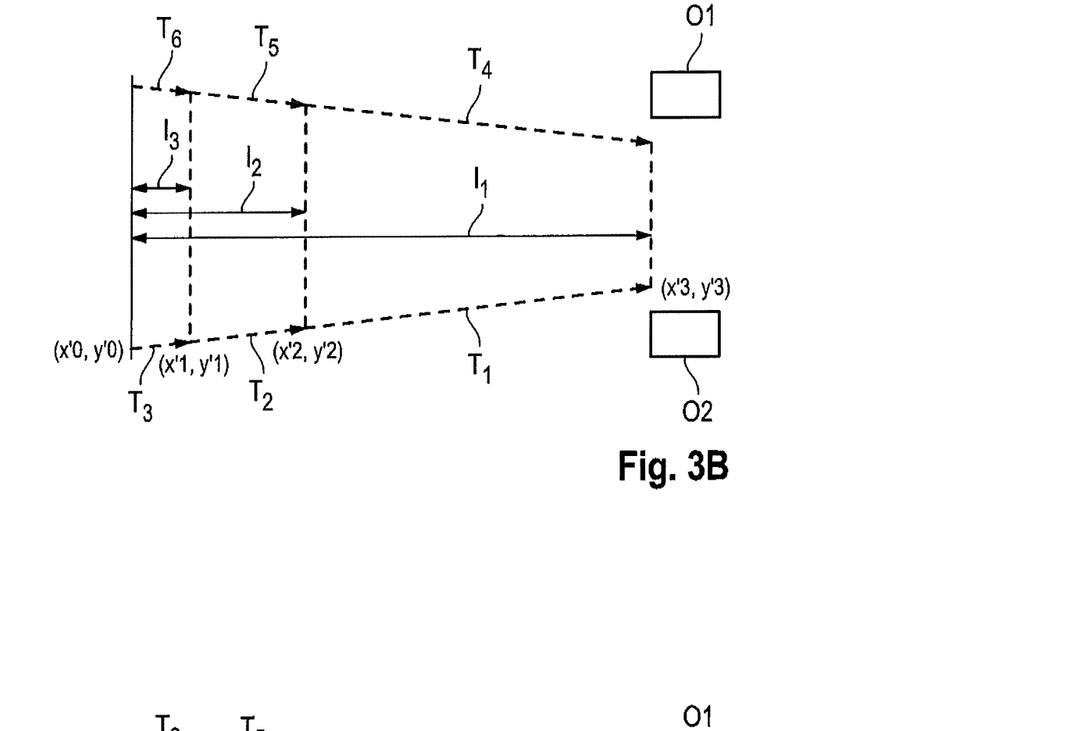
FIG. 3B shows the trajectories of FIG. 3A in a co-ordinate system referred to the image detecting unit.
Figure 3C:
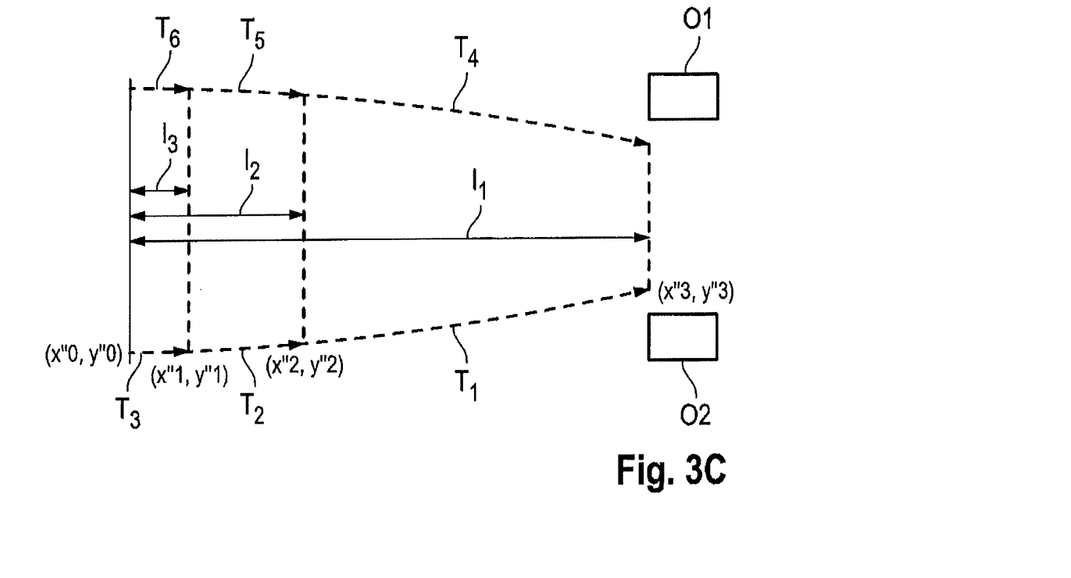
FIG. 3C shows the trajectories of FIG. 3B after correction to allow for the distortion of the image detecting unit.

FIGS. 3A to 3C show the simplest case where the civil engineering machine is reversing straight backwards. Consequently, the steering angles $\alpha$ of the front and rear wheels 2, 3; 4, 5 are zero. In FIG. 3A the running gear 1 having the front and rear wheels 2, 3; 4, 5 is only shown schematically. Representation is in a co-ordinate system (x, y), representing the reference plane, which is referred to the running gear of the civil engineering machine. The positions of the front and rear wheels 2, 3; 4, 5 are defined by the steering angle $\alpha$.

The chassis 6 of the civil engineering machine is represented by a rectangle in the co-ordinate system. The corners of the rectangle correspond to the front and rear corners of the machine. The milling arrangement 19 having the milling drum 20 is situated between the front and rear wheels 2, 3; 4, 5.

The origin (x0, y0) of the co-ordinate system referred to the running gear of the machine is situated at the left-hand corner of the chassis 6 of the machine which is at the rear in the direction of working I.

The calculating unit 16 has means 16A which, in one embodiment, calculate a total of six trajectories to represent the backward movement of the civil engineering machine, each of which is defined by a starting point and an end point. Because the civil engineering machine is reversing straight backwards, the trajectories are straight lines between the two points.

To determine the trajectory of the left-hand rear corner in the direction of working I (x0, y0) of the civil engineering machine when reversing for a stipulated distance which corresponds to the length of the chassis of the machine, the calculating unit calculates the co-ordinates (x3, y3) of that point in the co-ordinate system referred to the running gear of the civil engineering machine at which the left-hand rear corner of the chassis of the machine will be situated when the civil engineering machine has moved back by the length ($l_1$) of the machine, such as 9 m for example. In a corresponding way, the calculating unit calculates the co-ordinates, (x2, y2) and (x1, y1) respectively, at which the left-hand rear corner (x0, y0) of the chassis of the machine will be situated when the civil engineering machine has moved back by shorter distances, ($l_2$ and $l_3$ respectively), such as 3 m and 1 m respectively for example. These calculations are also made for the right-hand corner of the chassis of the machine which is at the rear in the direction of working I. This produces a representation of 6 trajectories $T_1$ to $T_6$ which are indicated by arrows. The dashed connecting lines between the points of the arrows indicate the position of the tail end of the civil engineering machine which it has moved back by the respective distances of travel such for example as 9 m, 3 m and 1 m.

However, the trajectories $T_1$ to $T_6$ shown in FIG. 3A in the co-ordinate system referred to the running gear of the civil engineering machine do not correspond to what is shown on the display unit 14, because the image detecting unit 15 detects the image of the rear part of the civil engineering machine at a viewing angle different from the viewing angle corresponding to the co-ordinate system referred to the running gear of the civil engineering machine, in which the civil engineering machine is shown in plan. The calculating unit 16 therefore has means 16B for converting the data, such for example as the co-ordinates (x0, y0) to (x3, y3) in the co-ordinate system of the civil engineering machine, to be in a co-ordinate system (x', y') referred to the image detecting unit 15.

FIG. 3B shows the trajectories $T_1$ to $T_6$ in the co-ordinate system of the image detecting unit 15, which co-ordinate system corresponds to the co-ordinate system of the display unit 14. A change in the viewing angle of the image detecting unit is thus able to result in a changed representation on the display unit 14. Basically however the viewing angle does not change because the camera 15A is connected to the chassis 6 of the machine at a stipulated viewing angle.

Some embodiments also allow for possible distortions which may occur when the image is detected in the image detecting unit. The objective lens of the camera 15A may for example distort, particularly in the edge region. Such distortions may result in the objects in the terrain or on the traffic-carrying routes or surfaces, when shown on the display unit, not correlating exactly with the trajectories which are superimposed on the image of the rear part of the civil engineering machine.

The calculating unit 16 has means 16C for correcting the data (x0', y0') to (x3', y3') defining the trajectories $T_1$ to $T_6$, in the co-ordinate system (x', y') referred to the image detecting unit. The means 16C correct the data on the basis of a first correcting function. Using the first correcting function, the data is corrected in such a way that the representation of the trajectories $T_1$ to $T_6$ is subject to substantially the same distortion as the image picked up by the camera 15A. FIG. 3C shows the "distorted image", after correction, of the trajectories $T_1$ to $T_6$ which has, in the co-ordinate system of the image detecting unit 15 which corresponds to the co-ordinate system of the display unit 14, the co-ordinates(x0", y0") to (x3", y3").

On the display unit 14 (FIG. 3C), the "distorted image" of the trajectories $T_1$ to $T_6$ is superimposed on the image of the rear part of the civil engineering machine detected by the image detecting unit 15. This is made clear in FIG. 3 by the showing of two objects O1 and O2 which are intended to represent the view from the rear part of the civil engineering machine. On the display unit 14, the driver of the machine can see that the civil engineering machine, when reversing straight backwards, will move towards the two objects but will not touch the said objects. He can see that he will have to move the civil engineering machine back by one length of the machine if he is to reach the objects.

Figure 4A:
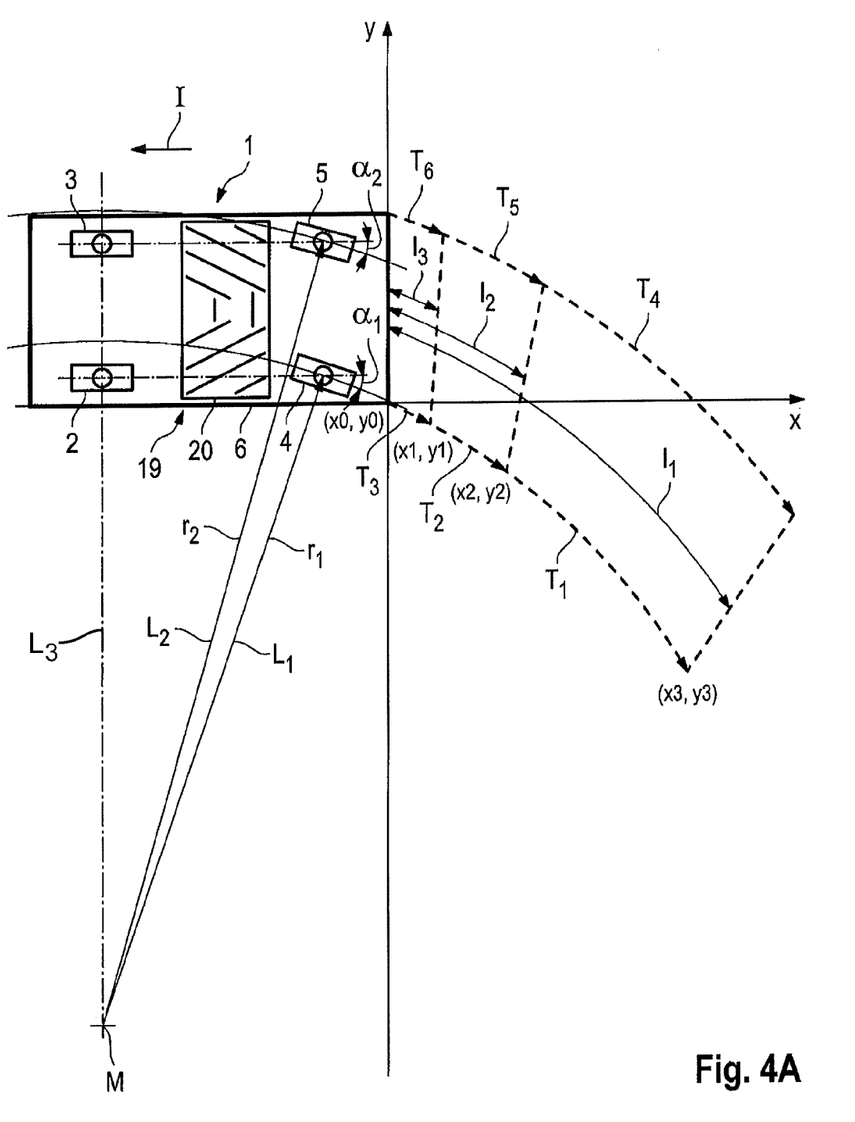
FIG. 4A is a highly simplified schematic view of the civil engineering machine and a view of the trajectories in the co-ordinate system referred to the civil engineering machine, with the civil engineering machine reversing in this case in a mode of steering in which the civil engineering machine is steered only with the rear wheels.
Figure 4B:
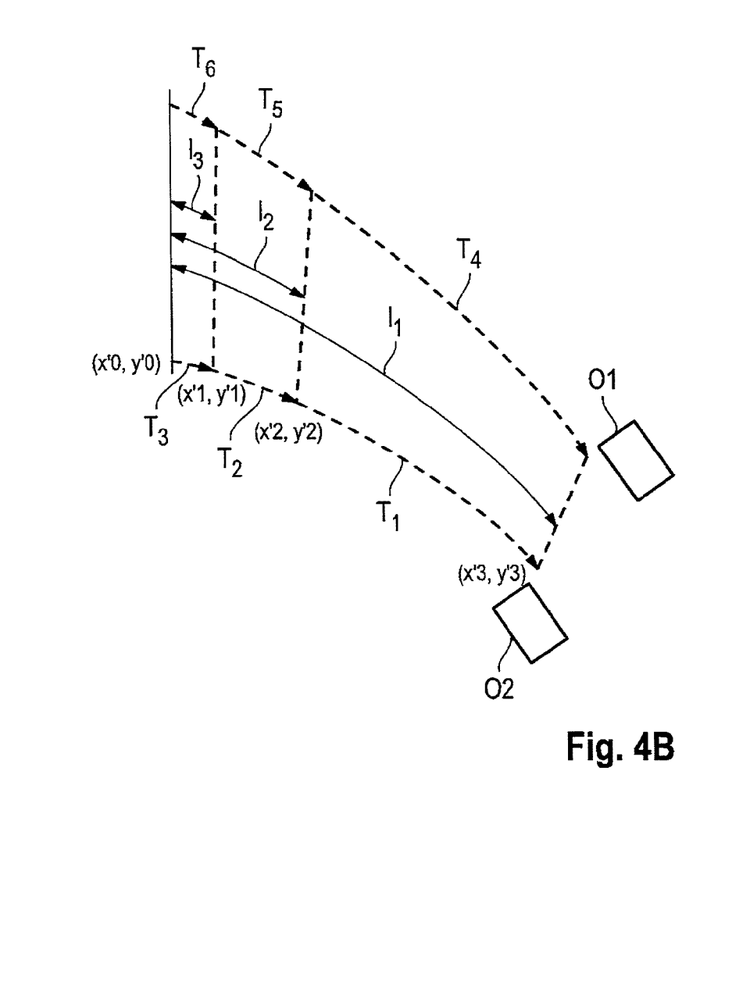
FIG. 4B shows the trajectories of FIG. 4A in the co-ordinate system referred to the image detecting unit.
Figure 4C:
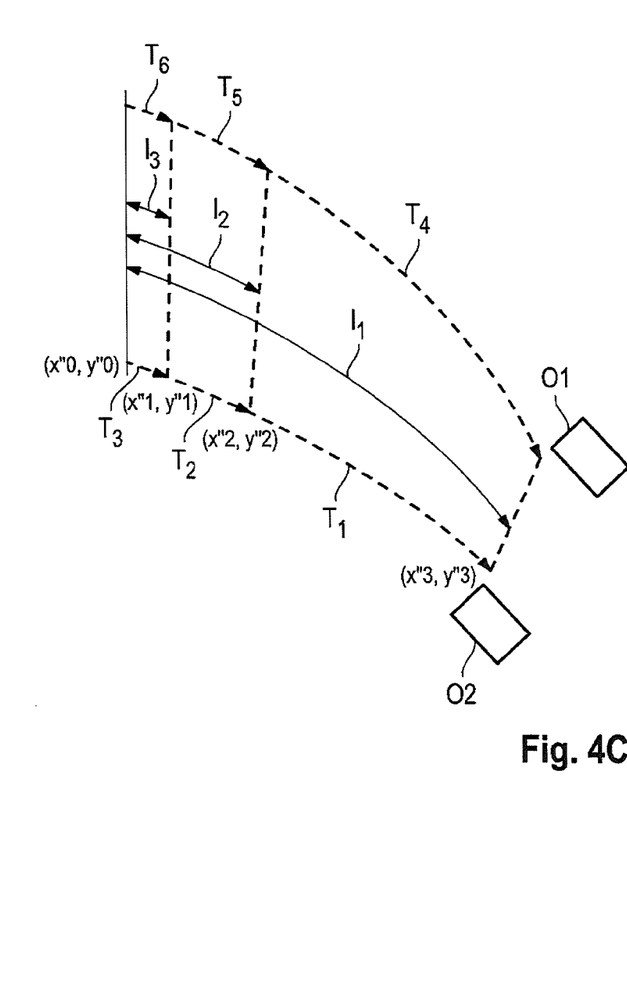
FIG. 4C shows the trajectories of FIG. 4B after correction to allow for the distortion of the image detecting unit.

In what follows, the movement of the civil engineering machine when reversing through a curve will be described by reference to FIGS. 4B and 4C, the civil engineering machine being steered only by the rear wheels in this case. This mode of steering means that the stipulating of given steering angles which the driver of the machine stipulates affects only the rear wheels while the steering angle of the front wheels remains at the angle of 0.

The steering arrangement 10 of the civil engineering machine is so designed that it follows the Ackermann principle at least approximately. Under the Ackermann principle, the extensions $L_1, L_2, L_3$ of the axes of all the wheels intersect at the common centre M of the turning circle. For this, the steering angle $\alpha_2$ of the wheel on the outside of the curve has to be smaller than the steering angle $\alpha_1$ of the wheel on the inside of the curve. The Ackermann principle determines the radius r of the arc along which a point on the civil engineering machine moves. As in the first embodiment, the calculating unit 16 once again calculates the starting and end points of 6 trajectories $T_1$ to $T_6$. Because the trajectories are not straight lines but arcs of a circle between starting and end points, the calculating unit calculates the radius r or centre M of the arcs which arises from the Ackermann principle.

FIG. 4A shows the trajectories $T_1$ to $T_6$ in the co-ordinate system (x, y) of the civil engineering machine. The trajectories $T_1$ to $T_6$ are once again converted to be in the co-ordinate system (x', y') of the image detecting unit 15 shown in FIG. 4B. In the co-ordinate system (x', y') of the image detecting unit, the trajectories are once again corrected by the first correcting function to enable allowance to be made for the distortion of the image detecting unit (FIG. 4C).

If the chassis 6 of the machine is adjusted in the heightwise direction, in which case the transverse and/or longitudinal inclination of the chassis of the machine may also change, the viewing angle of the camera 15A of the image detecting unit 15 changes at the same time.

If for example the front lifting columns 7 are extended upwards and the rear lifting columns 8 are retracted downwards, the chassis 6 of the machine is raised at the front and lowered at the rear. The chassis of the machine is consequently inclined in the longitudinal direction. If for example the left-hand lifting columns 7, 8 are extended upwards and the right-hand lifting columns 7, 8 are retracted downwards, the chassis of the machine is raised on the left and lowered on the right. The chassis of the machine 6 is consequently inclined in the transverse direction. It is also possible for transverse and longitudinal inclinations to be superimposed. Because the camera 15A of the image detecting unit 15 is solidly connected to the chassis 6 of the machine, the camera follows the movements of the chassis.

A longitudinal and/or transverse inclination of the chassis of the machine results in the trajectories shown on the display unit 14 no longer matching the image of the rear part shown on the display unit on which the trajectories are superimposed.

The calculating unit 16 has means 16D for correcting the data defining the at least one trajectory in the co-ordinate system (x', y') referred to the image detecting unit 15, on the basis of a second correcting function by which allowance is made for a change in the longitudinal inclination and/or transverse inclination and/or height of the camera 15A of the image detecting unit 15 relative to the co-ordinate system (x, y) referred to the running gear 1 of the civil engineering machine. It is assumed in this case that the trajectories were previously calculated for the case where the chassis 6 of the machine was at a stipulated height, and was not inclined in either the longitudinal or transverse direction, relative to the running gear 1 (was in the reference plane). If there is a change in the height and/or inclination of the chassis 6 of the machine, the trajectories shown on the display unit 14 are so converted, using the second correcting function, as function of the height and/or inclination sensed by the measuring arrangement (not shown) that the image shown on the display unit, such as that of the objects O1 and O2, and the trajectories are again shown in the correct relationship to one another.

If for example the chassis 6 of the machine is moved up at the front and moved down at the rear, then the image of the rear "shortens" on the display unit. However, the distance which the machine travels to cover a length of the machine remains the same. The trajectories are therefore stretched accordingly, which in the worst case may result in the trajectories running upwards off the image because the viewing angle of the camera is so steep that a region situated a length of the machine away is no longer shown at all. In the opposite case, where the machine is moved down at the front and up at the rear, the image becomes longer because the camera is looking far off into the distance. The trajectories are then compressed in the appropriate way.

Figure 5A:
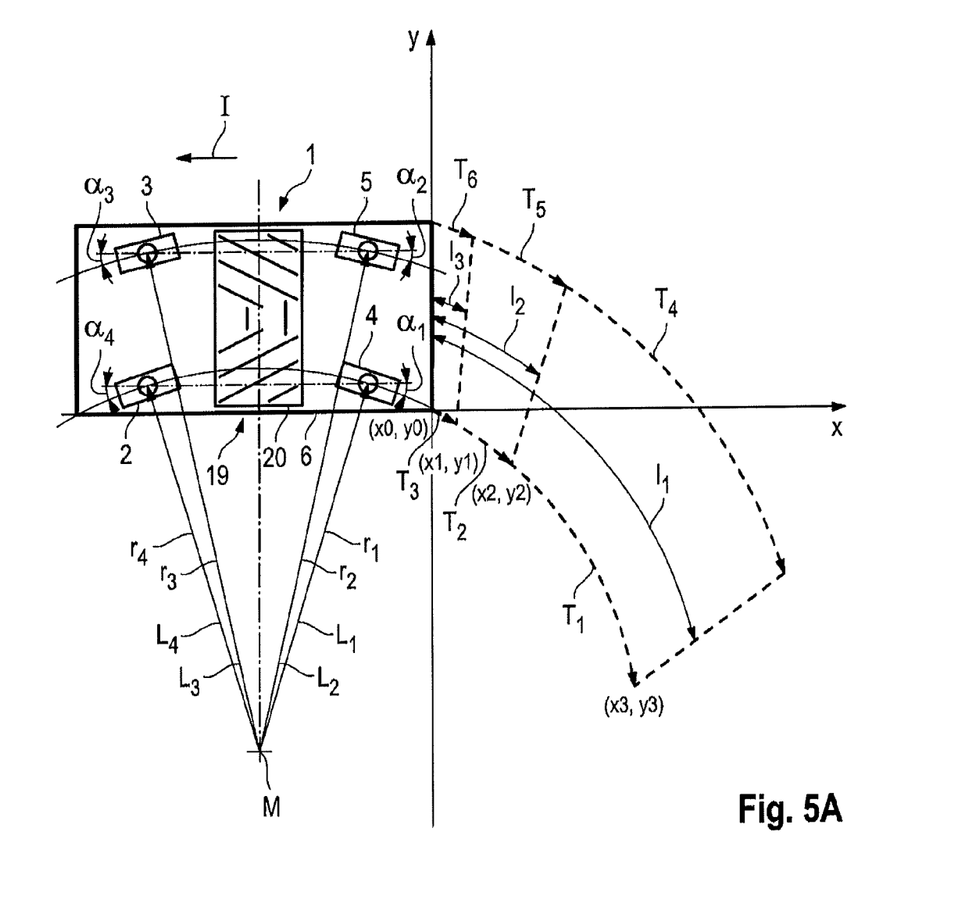
FIG. 5A is a highly simplified schematic view of the civil engineering machine and a view of the trajectories in the co-ordinate system referred to the civil engineering machine, with the civil engineering machine reversing in this case in a mode of steering in which the front and rear wheels steer in opposite directions.
Figure 5B:
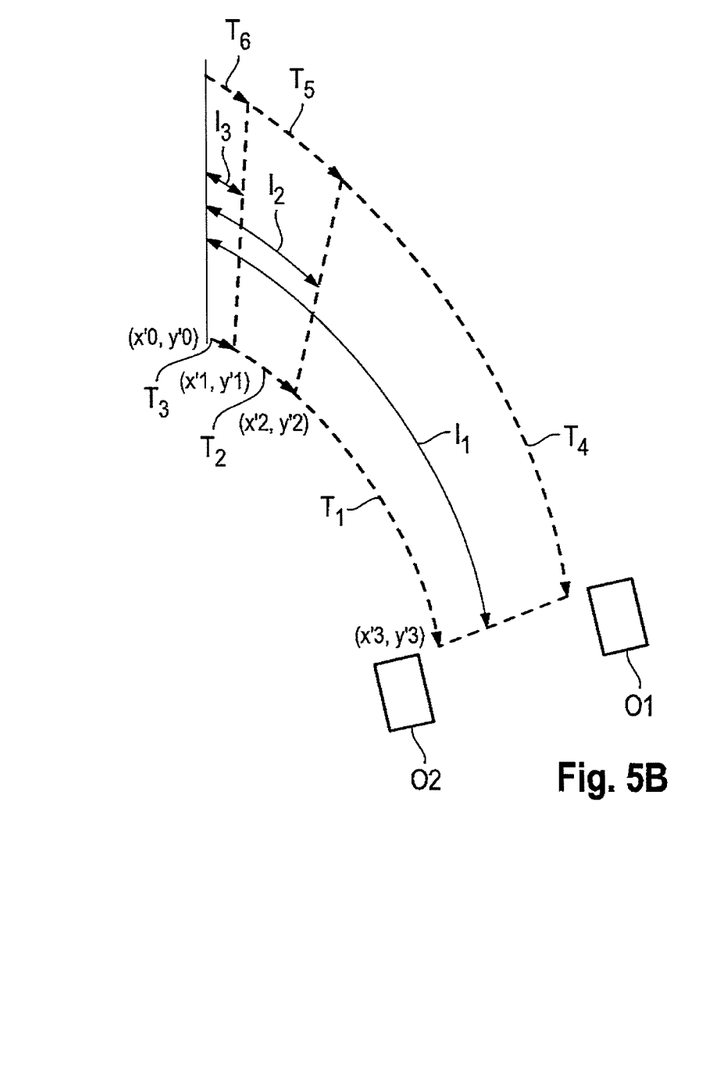
FIG. 5B shows the trajectories of FIG. 5A in the co-ordinate system referred to the image detecting unit.
Figure 5C:
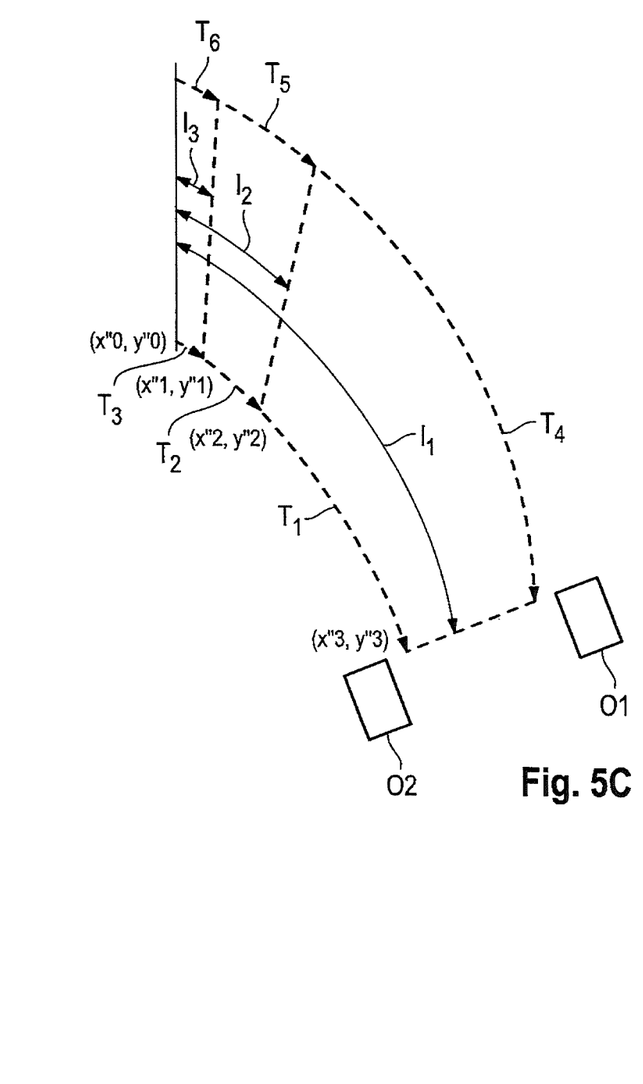
FIG. 5C shows the trajectories of FIG. 5B after correction to allow for the distortion of the image detecting unit.

FIGS. 5A to 5C show the case where the driver of the machine has selected the "co-ordinated steering" mode of steering and has stipulated a given steering angle. Because the steering arrangement 10 of the civil engineering machine approximately follows the Ackermann principle, the stipulating of the steering angle produces the appropriate positions for the wheels. The wheels on the inside and outside of the curve have different steering angles, with the steering angles of the wheels on the outside of the curve being smaller than the steering angles of the wheels on the inside of the curve. The extensions $L_1$, $L_2$, $L_3$, $L_4$ of the axes of the wheels intersect at the centre M of the turning circle, thus stipulating the radiuses $r_1$, $r_2$, $r_3$, $r_4$ of the trajectories referred to the planes of the individual wheels.

As in the previous embodiments, the calculating unit 16 calculates the trajectories $T_1$ to $T_6$ by which the movement of the civil engineering machine is defined, as a function of the "co-ordinated steering" steering mode which has been selected and the steering angle which has been set (FIG. 5A). The trajectories T1 to T6 in the co-ordinate system (x, y) of the civil engineering machine (FIG. 5A) are once again converted to be in the co-ordinate system (x', y') of the image detecting unit 15 (FIG. 5B), as described above. Once again, there is also a correction by the first and/or second correcting function (FIG. 5C).

Figure 6A:
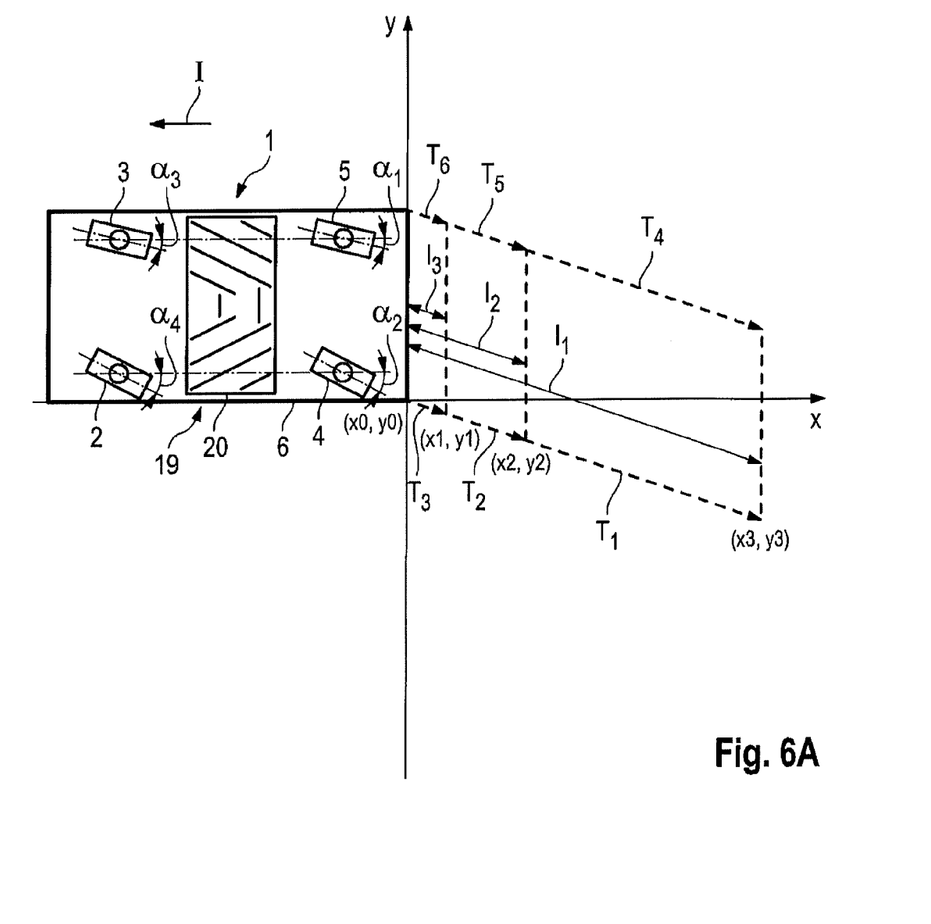
FIG. 6A is a highly simplified schematic view of the civil engineering machine and a view of the trajectories in the co-ordinate system referred to the civil engineering machine, with the civil engineering machine reversing in this case in a mode of steering in which the front and rear wheels steer in the same direction.
Figure 6B:
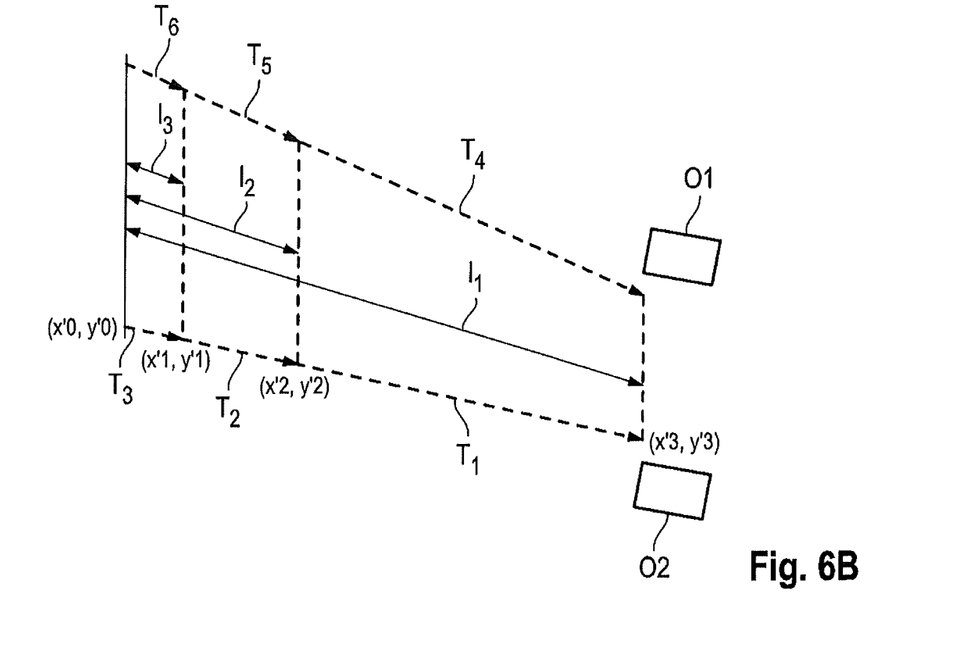
FIG. 6B shows the trajectories of FIG. 6A in the co-ordinate system referred to the image detecting unit.
Figure 6C:
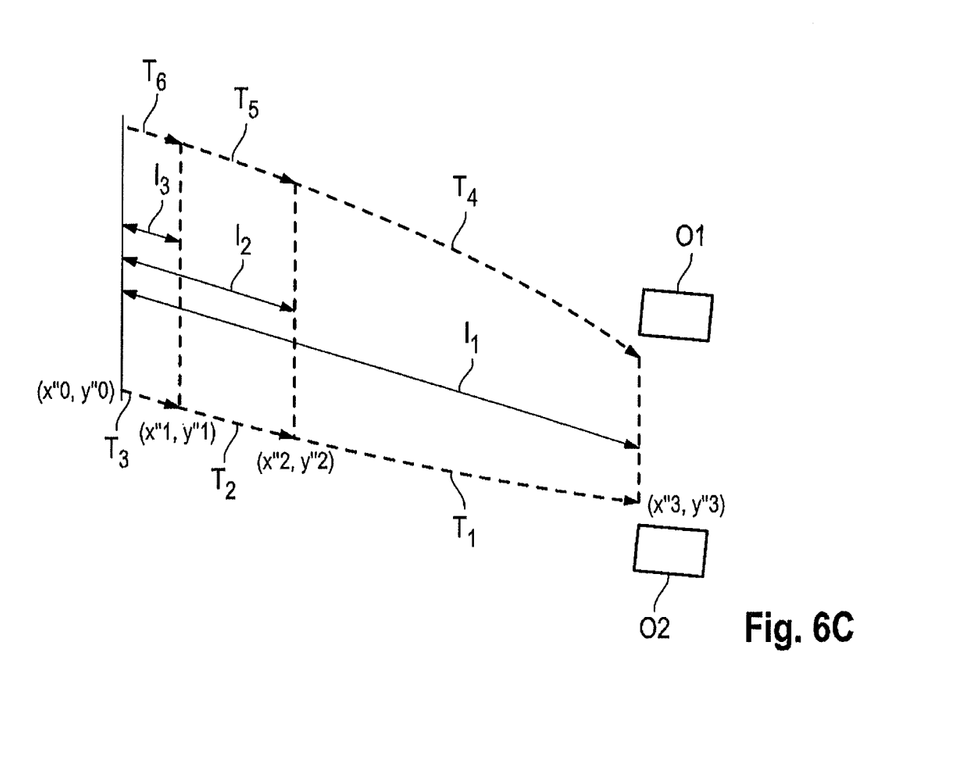
FIG. 6C shows the trajectories of FIG. 6B after correction to allow for the distortion of the image detecting unit.

FIGS. 6A to 6C show the "crab steering" mode of steering. If the driver of the machine selects the "crab steering" mode of steering and sets a given steering angle, the extensions of the axes of the wheels no longer extend through the centre of a turning circle and instead all the axes extend substantially parallel to one another. In this mode of steering the trajectories point in the direction in which the wheels point. In this case the wheels on one side and the wheels on the other side are directed in the same respective directions. However, under the Ackermann principle they are at different steering angles. The steering angle $\alpha_1,\alpha_3$ of the front or rear wheel respectively on one side is smaller than the steering angle $\alpha_2$, $\alpha_4$ of the front or rear wheel respectively on the other side. The civil engineering machine thus moves sideways.

The calculating unit 16 once again calculates the trajectories $T_1$ to $T_6$ which are determined by starting and end points. In the "crab steering" mode of steering the trajectories are not arcs of a circle but straight lines. Because the wheels on one side are at a different steering angle from the wheels on the other side, there is a slight difference between the directions of the trajectories referred to the planes of the individual wheels to enable the Ackermann principle to be followed. The trajectories determined by the calculating unit are in a direction which is between the two directions which are produced by the different steering angles for the wheel on one side and the wheel on the other side.

As in the previous embodiments, the trajectories $T_1$ to $T_6$ are once again converted from the co-ordinate system (x, y) of the civil engineering machine to be in the co-ordinate system (x', y') of the image detecting unit (FIG. 6B). One again, there is also a correction by the first and second correcting functions (FIG. 6C).

What is claimed is:

1. A self-propelled civil engineering machine, having a running gear which has wheels or other running-gear units which are at the front with respect to the working direction and wheels or other running-gear units which are at the rear with respect to the working direction, a chassis of the civil engineering machine which is carried by the wheels or other running-gear units, a drive arrangement for driving at least one of the front or rear wheels or other running-gear units, a steering arrangement for steering at least one of the front wheels or other running-gear units and the rear wheels or other running-gear units, and a unit having controls, said self-propelled civil engineering machine characterised in that:

the civil engineering machine has an arrangement for assisting a driver of the machine when reversing, the arrangement for assisting the driver of the machine when reversing having
 a unit for sensing a position of the front wheels or other running-gear units and rear wheels or other running-gear units,
 a calculating unit to determine data which defines at least one trajectory of the civil engineering machine as a function of the position of the front wheels or other running-gear units and the rear wheels or other running-gear units,
 an image detecting unit for detecting an image from a rear of the civil engineering machine,
 a display unit for displaying the detected image, and
 an image processing unit which is so designed that the at least one trajectory is superimposed on the image which is displayed on the display unit; and
wherein the unit having the controls has a selector for selecting one mode of steering from a plurality of modes of steering, the unit having the controls co-operating with the steering arrangement in such a way that the steering arrangement makes allowance for the selected mode of steering,
wherein the unit having the controls has a steering apparatus for stipulating a steering angle for at least one of the front or rear wheels or other running-gear units, the unit having the controls co-operating with the steering arrangement in such a way that the steering arrangement sets a stipulated steering angle, and
wherein the calculating unit calculates the data defining the at least one trajectory, as a function of the selected mode of steering, and the calculating unit corrects the data defining the at least one trajectory on the basis of a correcting function by which allowance is made for a change in at least one of a longitudinal inclination of the chassis, a transverse inclination of the chassis, or a height of the image detecting unit.

2. The civil engineering machine according to claim 1, characterised in that the calculating unit is so designed that the data defines the trajectory, with the selected mode of steering and the stipulated steering angle, in a co-ordinate system referred to the running gear of the civil engineering machine.

3. The civil engineering machine according to claim 2, characterised in that the calculating unit converts the data defining the at least one trajectory to be in a co-ordinate system referred to the image detecting unit in which the image is displayed on the display unit.

4. The civil engineering machine according to claim 3, characterised in that:
 the chassis of the machine is designed to be adjustable in at least one of a heightwise direction and in inclination,
 the calculating unit corrects the data defining the at least one trajectory in the co-ordinate system referred to the image detecting unit, on the basis of the correcting function by which allowance is made for the change in at least one of the longitudinal inclination, transverse inclination, or height of the image detecting unit relative to the co-ordinate system referred to the running gear of the civil engineering machine.

5. The civil engineering machine according to claim 1, characterised in that the calculating unit corrects the data defining the at least one trajectory in a co-ordinate system referred to the image detecting unit, on the basis of a correcting function by which allowance is made for distortion of the image detected by the image detecting unit.

6. The civil engineering machine according to claim 1, characterised in that the calculating unit for calculating data defining the at least one trajectory is so designed that there are calculated, in a co-ordinate system referred to the running gear of the civil engineering machine:
 a starting point which is situated at a reference point related to the civil engineering machine,
 an end point which is situated at a point at which the reference point is situated, after a movement back of the civil engineering machine for a stipulated distance of travel in the selected mode of steering and with the stipulated steering angle, and
 at least one of the radius or center of an arc of a circle extending between the starting point and the end point.

7. The civil engineering machine according to claim 6, characterised in that the stipulated distance of travel by which the civil engineering machine is to be moved back is at least part of a length of the civil engineering machine.

8. The civil engineering machine according to claim 7, characterised in that the calculating unit is so designed that an end point of a first trajectory whose starting point is situated on one longitudinal side of the civil engineering machine, and at the left-hand point thereof at the rear with reference to the working direction, is calculated, and an end point of a second trajectory whose starting point is situated on the other longitudinal side of the civil engineering machine, and at the right-hand point thereof at the rear with reference to the working direction, is calculated.

9. The civil engineering machine according to claim 1, characterised in that the unit having the controls co-operates with the steering arrangement in such a way that the steering arrangement sets steering angles of a front right-hand and a front left-hand wheel or other running-gear units and steering angles of a rear right-hand and a rear left-hand wheel or other running-gear units in such a way that the front and rear wheels or other running-gear units are being turned in the same direction in a first mode of steering.

10. The civil engineering machine according to claim 1, characterised in that the unit having the controls co-operates with the steering arrangement in such a way that the steering arrangement sets steering angles of a front right-hand and a front left-hand wheel or other running-gear units and steering angles of a rear right-hand and a rear left-hand wheel or other running-gear units in such a way that the front and rear wheels or other running-gear units are being turned in opposite directions in a second mode of steering.

11. The civil engineering machine according to claim 1, characterised in that the steering arrangement is so designed that extensions of axes of the wheels or other running-gear units intersect at a center of a turning circle.

12. An apparatus for assisting a driver of a civil engineering machine when reversing the civil engineering machine, said apparatus comprising:
- at least one position sensor configured to sense a position of at least one of a front running gear and a rear running gear of the civil engineering machine, wherein said position is a steering angle;
- a selector configured such that the driver may select one mode of steering from a plurality of modes of steering;
- a calculating unit configured to determine data that defines at least one trajectory of the civil engineering machine as a function of the position of the at least one of the front running gear and the rear running gear of the civil engineering machine and as a function of the selected mode of steering;
- an image detecting unit arranged on the civil engineering machine so as to detect an image from the rear of the civil engineering machine;
- an image processing unit configured to superimpose the data determined by the calculating unit defining the at least one trajectory on the image detected by the image detecting unit; and
- a display unit arranged on the civil engineering machine so as to display to the driver, the detected image with the at least one trajectory superimposed on the image;
- wherein the calculating unit determines the data that defines the at least one trajectory in a co-ordinate system referenced to the running gear of the civil engineering machine; and
- wherein the calculating unit converts the data defining the at least one trajectory from the co-ordinate system referenced to the running gear of the civil engineering machine to a co-ordinate system referenced to the image detecting unit.

13. The apparatus of claim 12, wherein:
- the display unit displays to the driver, the image detected by the image detecting unit with the data defining the at least one trajectory in the co-ordinate system referenced to the image detecting unit; and
- the calculating unit corrects the data defining the at least one trajectory in the co-ordinate system referenced to the image detecting unit, on the basis of a first correcting function to correct for distortion of the image detected by the image detecting unit.

14. The apparatus of claim 12, wherein the calculating unit determines, in the co-ordinate system referenced to the civil engineering machine:
- a starting point which is situated at a reference point of the civil engineering machine,
- an end point which is a point at which the reference point of the civil engineering machine is situated, after a reversing of the civil engineering machine for a selected distance of travel in a selected mode of steering with a selected steering angle for at least one of the front or rear running gear, and
- at least one of the radius or center of a circle having an arc extending between the starting point and the end point.

15. The apparatus of claim 12, wherein the data determined by the calculating unit comprises:
- an end point of a first trajectory whose starting point is situated on a first longitudinal side of the civil engineering machine at the rear of the civil engineering machine, and
- an end point of a second trajectory whose starting point is situated on the other longitudinal side of the civil engineering machine at the rear of the civil engineering machine.

16. The apparatus of claim 12, further comprising a control unit for setting the steering angle of at least one of a right running gear unit and a left running gear unit of the front running gear or a right running gear unit and a left running gear unit of the rear running gear, wherein:
- the control unit sets the steering angles of the right running gear unit and the left running gear unit of the front running gear, and the right running gear unit and the left running gear unit of the rear running gear in generally similar directions in a first mode of steering; and
- the control unit sets the steering angles of the right running gear unit and the left running gear unit of the front running gear, and the right running gear unit and the left running gear unit of the rear running gear in generally opposite directions in a second mode of steering.

17. A civil engineering machine comprising:
- a front running gear;
- a rear running gear;
- a selector configured such that a driver of the civil engineering machine can select one of a plurality of steering modes of the civil engineering machine;
- a control unit configured such that the driver can set a steering angle of at least one of the front running gear and the rear running gear; and
- an apparatus for assisting the driver of the civil engineering machine when reversing the civil engineering machine, said apparatus comprising:
  - a calculating unit configured to determine data that defines at least one trajectory of the civil engineering machine as a function of the steering angle of the at least one of the front running gear and the rear running gear of the civil engineering machine and the selected mode of steering;
  - an image detecting unit arranged on the civil engineering machine to detect an image from the rear of the civil engineering machine; and
  - a display unit arranged on the civil engineering machine to display to the driver, the detected image with the at least one trajectory superimposed on the image;
  - wherein the calculating unit determines the data that defines the at least one trajectory in a co-ordinate system referenced to the running gear of the civil engineering machine; and
  - wherein the calculating unit converts the data defining the at least one trajectory from the co-ordinate system referenced to the running gear of the civil engineering machine to a co-ordinate system referenced to the image detecting unit.

18. The civil engineering machine of claim 17, wherein the apparatus for assisting the driver of the civil engineering machine when reversing further comprises:
- at least one position sensor for sensing the steering angle of the at least one of the front running gear and the rear running gear of the civil engineering machine; and
- an image processing unit for superimposing the data determined by the calculating unit defining the at least one trajectory on the image detected by the image detecting unit.

19. The civil engineering machine of claim 17, wherein:
- the display unit displays to the driver, the image detected by the image detecting unit with the data defining the at least one trajectory in the co-ordinate system referenced to the image detecting unit; and the calculating unit corrects the data defining the at least one trajectory in the co-ordinate system referenced to the image detecting unit, on the basis of a first correcting function to correct for distortion of the image detected by the image detecting unit.

20. The civil engineering machine of claim 17, wherein the calculating unit determines, in the co-ordinate system referenced to the running gear of the civil engineering machine:
   a starting point which is situated at a reference point of the civil engineering machine,
   an end point which is a point at which the reference point of the civil engineering machine is situated, after a reversing of the civil engineering machine for a selected distance of travel in a selected mode of steering with a selected steering angle for at least one of the front or rear running gear, and
   at least one of the radius or center of a circle having an arc extending between the starting point and the end point.

21. The civil engineering machine of claim 17, wherein the data determined by the calculating unit comprises:
   an end point of a first trajectory whose starting point is situated on a first longitudinal side of the civil engineering machine at the rear of the civil engineering machine, and
   an end point of a second trajectory whose starting point is situated on the other longitudinal side of the civil engineering machine at the rear of the civil engineering machine.

22. The civil engineering machine of claim 17, wherein:
   the control unit sets the steering angles of a right running gear unit and a left running gear unit of the front running gear, and a right running gear unit and a left running gear unit of the rear running gear in generally similar directions in a first mode of steering; and
   the control unit sets the steering angles of the right running gear unit and the left running gear unit of the front running gear, and the right running gear unit and the left running gear unit of the rear running gear in generally opposite directions in a second mode of steering.

23. A method of assisting a driver of a civil engineering machine when reversing the civil engineering machine, said method comprising:
   determining, using a position sensor, a position of at least one of a front or rear running gear of the civil engineering machine;
   determining a selected mode of a plurality of modes of steering;
   determining, using a calculating unit, data that defines at least one trajectory of the civil engineering machine as a function of the determined position and the selected mode of steering;
   detecting an image from the rear of the civil engineering machine; and
   displaying to the driver, the detected image with the at least one trajectory superimposed on the image; and
   correcting the data defining the at least one trajectory in a co-ordinate system referenced to the detected image, on the basis of a correcting function to correct for changes in at least one of height of the civil engineering machine, longitudinal inclination of the civil engineering machine, or transverse inclination of the civil engineering machine.

24. The method of claim 23 further comprising:
   converting the data defining the at least one trajectory from a co-ordinate system referenced to the running gear of the civil engineering machine to the co-ordinate system referenced to the detected image.

25. The method of claim 24 further comprising:
   correcting the data defining the at least one trajectory in the co-ordinate system referenced to the detected image, on the basis of a correcting function to correct for distortion of the detected image.

\* \* \* \* \*